United States Patent
Lai

(10) Patent No.: US 9,395,564 B2
(45) Date of Patent: Jul. 19, 2016

(54) LIQUID CRYSTAL DISPLAY DEVICE AND METHOD FOR REPAIRING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Yiqiang Lai, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 252 days.

(21) Appl. No.: 13/955,534

(22) Filed: Jul. 31, 2013

(65) Prior Publication Data

US 2014/0035899 A1 Feb. 6, 2014

(30) Foreign Application Priority Data

Aug. 1, 2012 (CN) .......................... 2012 1 0272826

(51) Int. Cl.
*G09G 3/36* (2006.01)
*G02F 1/13* (2006.01)

(52) U.S. Cl.
CPC ............ *G02F 1/1309* (2013.01); *G09G 3/3611* (2013.01); *G09G 3/3696* (2013.01); *G09G 2310/0251* (2013.01); *G09G 2330/08* (2013.01); *G09G 2330/12* (2013.01)

(58) Field of Classification Search
CPC .............. G09G 3/3611; G09G 3/3696; G09G 2330/08; G09G 2330/12; G09G 2310/0251; G09G 3/006; G09G 3/36; G02F 1/1309
USPC ...................................... 345/94, 212
See application file for complete search history.

(56) References Cited

U.S. PATENT DOCUMENTS

2005/0168491 A1* 8/2005 Takahara et al. .............. 345/690
2007/0126618 A1* 6/2007 Tanaka et al. ................. 341/155
2007/0216618 A1* 9/2007 Kim et al. ....................... 345/87

FOREIGN PATENT DOCUMENTS

CN 102495486 A 6/2012

OTHER PUBLICATIONS

Second Chinese Office Action Appln. No. 2012102728264; Dated Aug. 25, 2014.
First Chinese Office Action dated Jun. 3, 2014; Appln. No. 201210272826.4.

\* cited by examiner

*Primary Examiner* — Gustavo Polo
(74) *Attorney, Agent, or Firm* — Ladas & Parry LLP

(57) ABSTRACT

Embodiments of the invention disclose a LCD device and a method for repairing the same. The LCD device of the embodiment of the invention comprises a panel on which a plurality of data lines are disposed, the LCD device has at least one broken data line, one end of the broken data line is connected to a pre-charge circuit which causes output signals of the broken data line to have a pre-charge voltage waveform, the other end of the broken data line is connected to the pre-charge circuit via a long lead wire.

15 Claims, 2 Drawing Sheets

The output signal from the broken data line

Output signal of the pre-charge circuit

LIQUID CRYSTAL DISPLAY DEVICE AND METHOD FOR REPAIRING THE SAME

FIELD OF THE ART

Embodiments of the invention relates to a liquid crystal display (LCD) device and a method for repairing the same.

BACKGROUND

When fabricating a Thin Film Transistor Liquid Crystal Display (TFT-LCD) panel, there may be broken data lines in the panel due to various reasons. In this case, pixels corresponding to a broken data line can not receive output data and an obvious bright line (or dark line) may appear when the panel is powered on. Such a defect is unacceptable to consumers while discarding the panel directly may cause significant waste.

For overcoming the above issue, a conventional technology provides the following technical solution: a data drive output channel corresponding to the broken data line is routed to a Printed Circuit Board (PCB) by laser welding and connected to an input terminal of an operational amplifier buffer (OP buffer), an output terminal of which is connected to a reserved test line in the panel. The test line is then connected to another segment of the broken data line by laser welding and the display of the segment of the broken data line may be charged by the test line. By this means, a line defect is turned into a dot defect, which generally will not severely affect display quality of the LCD. However, routing to the PCB is necessary for such a method to repair the broken data line, which greatly increases the routing distance of the data line and RC loading of the routing; as a result, an OP buffer should be added on the PCB to drive the broken data line. Since dimensions of the LCD panels are ever growing and the routing distance is increased accordingly, the RC load of the control signal transmitted on the wiring is also increased, which severely degrades the transmitted signal and a single OP buffer can not meet actual requirements.

SUMMARY

One object of the invention is to provide a LCD panel and a method for repairing the same, such that signal distortions due to over-long wiring are reduced and display quality is improved.

Embodiments of the invention realize the above object by the following technical solutions.

A LCD device comprising a panel on which a plurality of data lines are disposed, the LCD device having at least one broken data line, one end of the broken data line connected to an input end of a pre-charge circuit which causes output signals of the broken data line to have a pre-charge voltage waveform, the other end of the broken data line is connected to an output end of the pre-charge circuit via a long lead wire.

As an example, the pre-charge circuit comprises a multiplexer and an operational amplifier buffer, the output signal of the broken data line is input into an input terminal of the multiplexer as one of the input signals of the multiplexer; and an output terminal of the multiplexer is connected to an input terminal of the operational amplifier buffer.

The LCD device further comprises a voltage source and a timing controller, the voltage source generates a high pre-charge voltage and a low pre-charge voltage and for supplying the high and low pre-charge voltages to input terminals of the multiplexer, the timing controller periodically generates a timing control signal for controlling a time of supplying the pre-charge voltages to the multiplexer by the voltage source.

The pre-charge voltage can be generated by any other voltage source, and the timing control signal can be generated periodically by any other timing signal generator.

At least one end of the broken data line has a connection point disposed thereon. As an example, the connection point is a welding spot.

In another aspect, an embodiment of the invention further provides a method for repairing a LCD device, the LCD device comprising a panel and a plurality of data lines disposed on the panel, the LCD device having at least one broken data line, the method comprises:

detecting a position of the broken data line in the LCD device;

connecting one end of the broken data line to an input end of a pre-charge circuit and connecting the other end of the broken data line to an output end of the pre-charge circuit via a long lead wire, wherein the pre-charge circuit causes an output signal of the broken data line to have a pre-charge voltage waveform.

The repairing method further comprises supplying a high pre-charge voltage and a low pre-charge voltage to a multiplexer of the pre-charge circuit, and controlling applying time of the pre-charge voltage on the multiplexer by using a timing signal.

The pre-charge voltage can be generated by the voltage source of the LCD or by any other voltage source, and the timing control signal can be generated periodically by a timing controller of the LCD device or by any other timing controller.

The repairing method further comprises the following step after detecting the position of the broken data line in the LCD device and before connecting one end of the broken data line to the pre-charge circuit:

making a connection point on at least one end of the broken data line.

As an example, the connection point is a welding spot.

In the LCD device and the method for repairing the LCD device provided by the embodiments of the invention, one end of the broken data line is connected to a pre-charge circuit, the other end of the broken data line is connected to the pre-charge circuit via a long lead wire such that an output signal of the broken data line has a pre-charge voltage waveform, thereby improving the display quality.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiments, without any inventive work, which should be within the scope of the invention.

Embodiments of the invention provide a LCD panel and a method for repairing the same, which may reduce signal distortion caused by over-long wiring, thereby improving display quality.

In the following description, details of specific system configurations, interfaces and technologies are provided to facilitate the understanding of the invention, and are therefore illustrative and not limitative. However, it can be understood by those skilled in the art that the invention may be implemented without the technical details. In other scenarios, detailed descriptions of devices, circuits and methods well-known to those skilled in the art are omitted for simplicity purpose.

Figure 1:
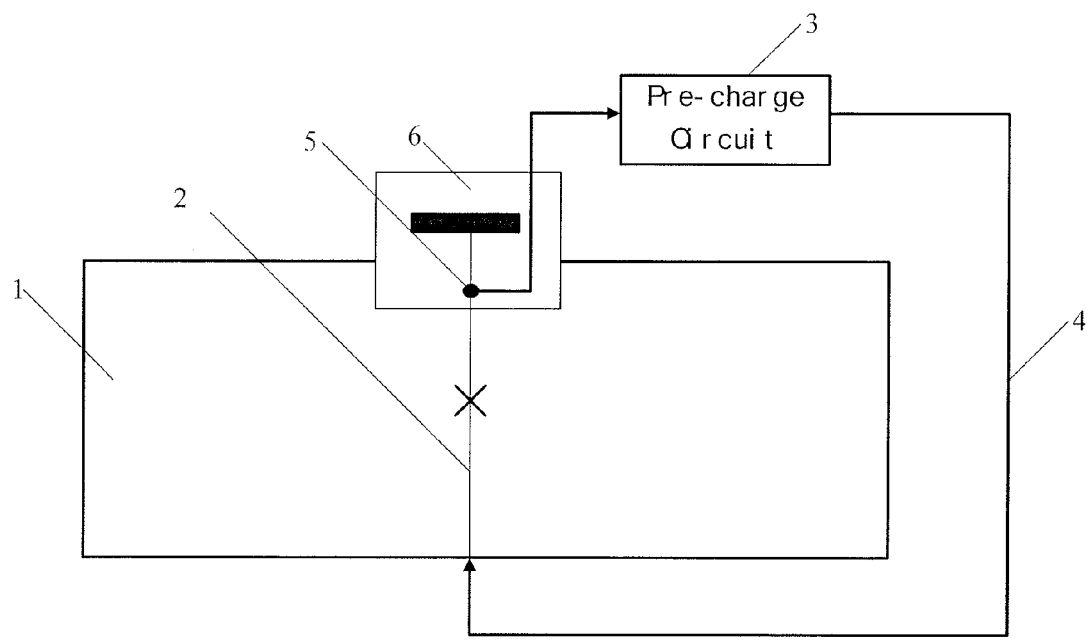
FIG. 1 schematically illustrates a configuration of a LCD device in accordance with an embodiment of the invention.
Figure 2:
FIG. 2 schematically illustrates output signal waveforms of a broken data line and of a pre-charge signal in accordance with an embodiment of the invention.
Figure 2:
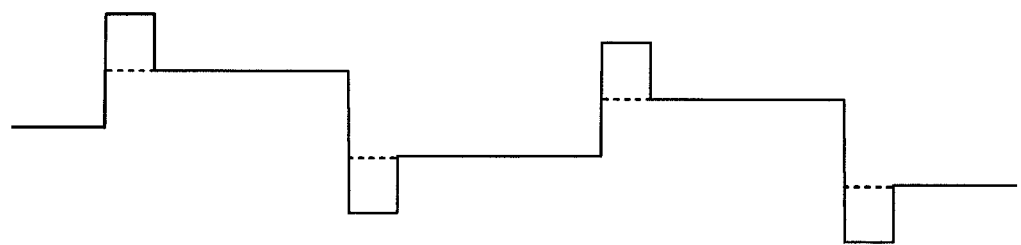
Figure 3:
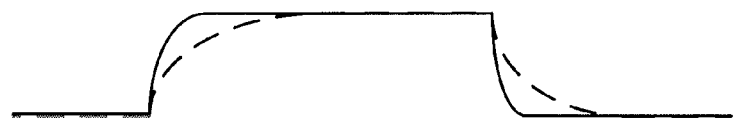
FIG. 3 schematically illustrates a comparison of a waveform of an output signal of the broken data line arriving at the other end in accordance with the embodiment of the invention with a waveform of an output signal arriving at the other end in the convention repairing technology.

As illustrated in FIG. 1, an embodiment of the invention provides a LCD device comprising a panel 1, on which a plurality of data lines, a plurality of gate lines and TFTs are disposed; the gate lines are connected to gate electrodes of the TFTs to turn ON/OFF the TFTs; the data lines are connected to source electrodes of the TFTs; when the TFTs are turned on, the data lines send level signals to drain electrodes of the TFTs and drive pixel electrodes to display. When a data line 2 of the LCD device is broken, after detecting and locating a position of the broken data line 2, a pre-charge circuit 3 is connected to one end of the broken data line 2, and the other end of the broken data line 2 is connected to the pre-charge circuit 3 via a long lead line 4. When the LCD device is powered on, a signal output from the broken data line 2 will eventually arrive at the other end of the broken data line via the pre-charge circuit 3 and the long lead wire 4. Here, the pre-charge circuit 3 is for causing the output signal from the broken data line 2 to have a waveform of a pre-charge voltage. As illustrated in FIG. 2, the pre-charge circuit 3 causes a high level of a rectangular wave to have a waveform of a high pre-charge voltage and a low level of the rectangular wave to have a waveform of a low pre-charge voltage, wherein the high pre-charge voltage is greater than the high level of the output signal from the broken data line 2 and the low pre-charge voltage is less than the low level of the output signal from the broken data line 2. As illustrated in FIG. 3, under the effect of the pre-charge circuit 3, when the output signal arrives at the other end of the broken data line 2 via the long lead wire 4, distortion of the output signal is obviously reduced, in which the dashed line indicates a waveform of the output signal of the broken data line 2 that arrives at the other end of the broken data without passing through the pre-charge circuit 3, while the solid line indicates a waveform of the output signal of the broken data line 2 that arrives the other end of the broken data line under the effect of the pre-charge circuit 3.

Furthermore, to facilitate connection of the broken data line 2 to other lead wires, a connection point 5 is disposed on at least one end of the broken data line 2. As an example, the connection point 5 may be a welding spot. For example, the long lead wire 4 is connected to the broken data line 2 via the welding spot.

Figure 4:
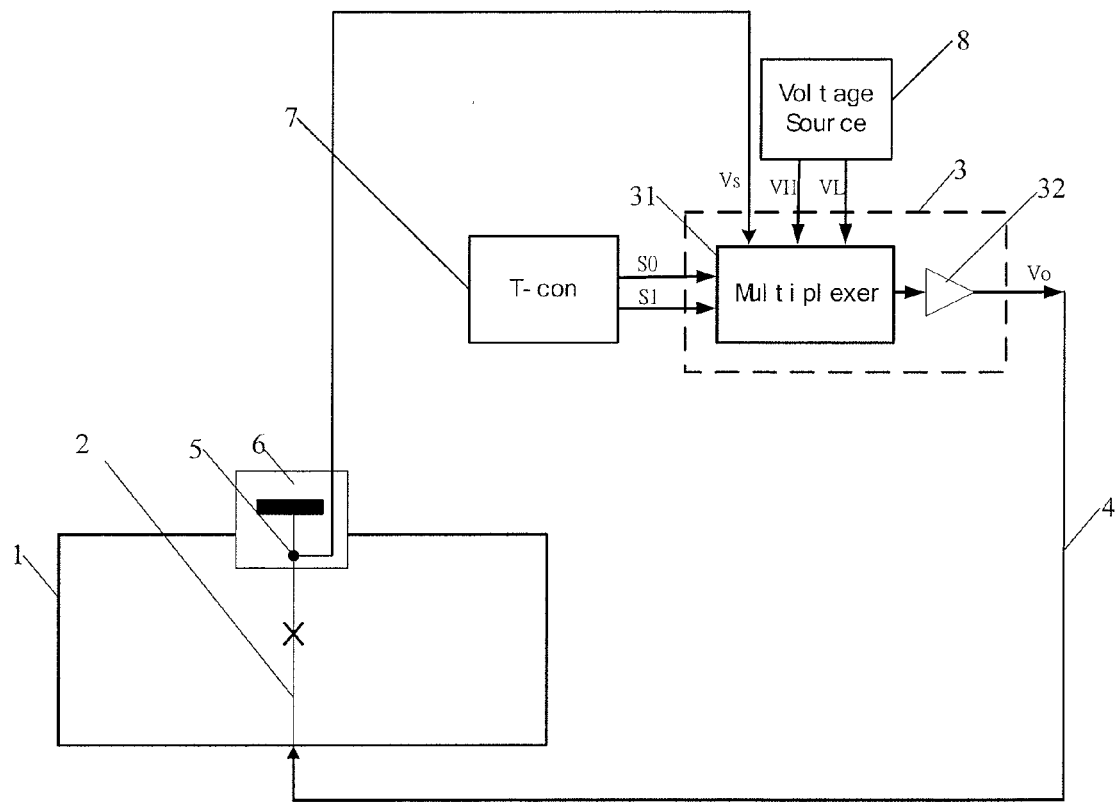
FIG. 4 schematically illustrates a pre-charge circuit in accordance with an embodiment of the invention.

Furthermore, as illustrated in FIG. 4, the pre-charge circuit 3 comprises a multiplexer 31 and an OP buffer 32. An end of the broken data line 2 is connected to an input terminal of the multiplexer 31, an output terminal of the multiplexer 31 is connected to an input terminal of the OP buffer 32, and the output signal of the broken data line 2 sequentially goes through the multiplexer 31 and the OP buffer 32. In the following, an explanation of how the multiplexer 31 and the OP buffer 32 make the output signal of the broken data line 2 to have the waveform of the pre-charge voltages will be described.

As illustrated in FIG. 4, the multiplexer 31 has three input voltages Vs, VH and VL, wherein Vs is the output signal of the broken data line 2, VH is a generated high pre-charge voltage, VL is a generated low pre-charge voltage, and V0 is the output signal of the pre-charge circuit 3. For example, in the illustrated embodiment, the pre-charge voltages VH and VL may be provided by a voltage source 8 disposed in the LCD device. The high pre-charge voltage VH and the low pre-charge voltage VL may also be provided by any other modules that may generate voltages, which will not be defined here. Under the control of timing signals S0 and S1, the multiplexer 31 selects one from the output signal Vs of the broken data line 2, the high pre-charge voltage VH and the low high pre-charge voltage VL as the output signal. For example, the timing signals S0, S1 may be timing control signals generated periodically by a timing controller (T-con) 7 for controlling an applying time of the pre-charge voltage generated by the voltage source 8 on the multiplexer. In an embodiment of the invention, the timing controller 7 may be a timing controller in an array substrate drive circuit that controls the ON/OFF states of gate lines. Furthermore, the timing signals S0, S1 may also be provided by any other modules that may generate periodically controlling signals, which will not be defined here. The following table shows a relationship between the timing signals S0, S1 and the output of the multiplexer 31.

| S1 | S0 | $V_O$ |
|---|---|---|
| 0 | 0 | $V_S$ |
| 0 | 1 | $V_H$ |
| 1 | 0 | $V_L$ |
| 1 | 1 | X |

It is seen from the above table that when S0, S1 are 0, respectively, the multiplexer 31 outputs the signal Vs from the broken data line 2; when S0, S1 are 0 and 1, respectively, the multiplexer 31 outputs the high pre-charge voltage VH such that the high level of the rectangular wave has the waveform of the high pre-charge voltage; when S0, S1 are respectively 1, 0, the multiplexer 31 outputs the low pre-charge voltage VL such that the low level of the rectangular wave has the waveform of the low pre-charge voltage. The output signal of the multiplexer 31 goes through the OP buffer 31 to increase the driving capacity of the output stage, and forming the final output signal V0.

Furthermore, the LCD device further comprises a PCB on which the pre-charge circuit 3 is disposed. A Chip On Film (abbreviated to COF) is disposed on the panel 1 and the output terminal of the broken data line 2 is connected to the pre-charge circuit 3 on the PCB through the COF 6.

In the LCD device of the embodiment of the invention, the pre-charge circuit is connected to one end of the broken data line such that the output signal of the broken data line has the waveforms of the pre-charge voltages, which reduces the waveform distortion caused by over-long wiring, thereby improving the display quality.

Another embodiment of the invention further provides a method for repairing a LCD device, the LCD device comprising a panel and a plurality of data lines disposed on the panel, the LCD device having at least one broken data line, the method comprises the following steps:

Step 101: detecting a position of the broken data line in the LCD device;

Step 102: connecting a pre-charge circuit to one end of the broken data line for causing an output signal of the broken data line to have a pre-charge voltage waveform; and connecting the other end of the broken data line to the pre-charge circuit via a long lead wire.

Furthermore, as an example, the pre-charge circuit comprises a multiplexer and an operational amplifier buffer, the broken data line is connected to the multiplexer, and the output signal of the broken data line is one of the input signals of the multiplexer.

The LCD device further comprises a timing controller and a voltage source, a high pre-charge voltage and a low pre-charge voltage generated by the voltage source is supplied to the multiplexer, a timing control signal periodically generated by the timing controller controls applying time of the voltage source on the multiplexer.

Furthermore, the method of the embodiment further comprises the following step after detecting a position of the broken data line in the LCD device and before connecting one end of the broken data line to a pre-charge circuit:

Step 103: making a connection point on at least one end of the broken data line.

As an example, the connecting point is a welding spot.

The operational principle of the repairing method of the embodiment is the same as that of the above-described device embodiment and will not be elaborated here.

In the method for repairing the LCD device provided by the embodiments of the invention, after detecting and locating the broken data line, one end of the broken data line is connected to a pre-charge circuit, the other end of the broken data line is connected to the pre-charge circuit via a long lead wire such that a waveform of the output signal of the broken data line has the pre-charge voltage waveform, thereby reducing the waveform distortion caused by over-long wiring and improving the display quality.

The foregoing are merely exemplary embodiments of the invention, but are not used to limit the protection scope of the invention. The protection scope of the invention shall be defined by the attached claims.

What is claimed is:

1. A LCD device comprising a panel and a plurality of data lines disposed on the panel, the LCD device having at least one data line broken into a first part and a second part, one end of the first part connected to an input end of a pre-charge circuit, and one end of the second part, wherein output signals of the first part have a pre-charge voltage waveform after being processed by the pre-charge circuit.

2. The LCD device of claim 1, wherein the pre-charge circuit comprises a multiplexer and an operational amplifier buffer, and the one end of the broken data line is connected to an input terminal of the multiplexer.

3. The LCD device of claim 2, further comprising a voltage source and a timing controller, the voltage source used for generating a high pre-charge voltage and a low pre-charge voltage supplied to the multiplexer, the timing controller used for periodically generating timing control signals for controlling applying time of the voltage source on the multiplexer.

4. The LCD device of claim 3, wherein the high pre-charge voltage output by the voltage source is greater than a high level of the output signal of the broken data line, the low pre-charge voltage output by the voltage source is less than a low level of the output signal of the broken data line.

5. The LCD device of claim 1, wherein at least one end of the broken data line has a connection point disposed thereon.

6. The LCD device of claim 5, wherein the connection point is a welding spot.

7. The LCD device of claim 1, wherein a Chip On Film is disposed on the panel, and the output of the broken data line is connected to the pre-charge circuit through the Chip On Film.

8. A method for repairing a LCD device, the LCD device comprising a panel and a plurality of data lines disposed on the panel, the LCD device having at least one data line broken into a first part and a second part, the method comprising:
   detecting and locating a position of the broken data line in the LCD device;
   connecting one end of the first part to a pre-charge circuit and connecting one end of the second part to the pre-charge circuit via a long lead wire, wherein the pre-charge circuit causes output signals of the broken data line to have a pre-charge voltage waveform.

9. The method of claim 8, wherein a high pre-charge voltage of the pre-charge voltage is greater than the high level of the output signal of the broken data line, and a low pre-charge voltage of the pre-charge voltage is less than the low level of the output signal of the broken data line.

10. The method of claim 8, wherein the pre-charge circuit comprises a multiplexer and an operational amplifier buffer, and one end of the broken data line is connected to an input terminal of the multiplexer.

11. The method of claim 10, further comprising supplying a high pre-charge voltage and a low pre-charge voltage of the pre-charge voltage to the multiplexer, and periodically generating timing control signals for controlling applying time of the pre-charge voltage on the multiplexer.

12. The method of claim 11, wherein the pre-charge voltages being generated by a voltage source of the LCD device or by any other voltage source.

13. The method of claim 11, wherein the timing control signals being generated periodically by a timing controller of the LCD device or by any other timing controller.

14. The method of claim 8, further comprising the following step after detecting a position of a broken data line in the LCD device and before connecting one end of the broken data line to a pre-charge circuit:
   making a connection point on at least one end of the broken data line.

15. The method of claim 14, wherein the connection point is a welding spot.

* * * * *